United States Patent
Pequito et al.

(10) Patent No.: US 11,514,052 B1
(45) Date of Patent: *Nov. 29, 2022

(54) TAGS AND PERMISSIONS IN A CONTENT MANAGEMENT SYSTEM

(71) Applicant: Contentful GmbH, Berlin (DE)

(72) Inventors: Jean-Pierre Pequito, Berlin (DE); Olubukola Makinwa, Berlin (DE); Paolo Negri, Berlin (DE)

(73) Assignee: Contentful GmbH, Berlin (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/475,830

(22) Filed: Sep. 15, 2021

Related U.S. Application Data

(63) Continuation of application No. 17/386,456, filed on Jul. 27, 2021, which is a continuation of application No. 17/386,286, filed on Jul. 27, 2021.

(51) Int. Cl.
*G06F 16/2455* (2019.01)

(52) U.S. Cl.
CPC .................. *G06F 16/2455* (2019.01)

(58) Field of Classification Search
None
See application file for complete search history.

(56) References Cited

U.S. PATENT DOCUMENTS

| | | | |
|---|---|---|---|
| 9,911,130 B1 * | 3/2018 | Battisti | G06Q 30/0201 |
| 2011/0125774 A1 * | 5/2011 | Dow | G06F 16/48 707/769 |
| 2013/0111506 A1 * | 5/2013 | Guddanti | G06F 16/9574 719/328 |
| 2014/0344656 A1 * | 11/2014 | Groom | G06F 16/44 715/202 |
| 2016/0110370 A1 * | 4/2016 | Wetherall | G06F 16/13 707/825 |
| 2020/0327149 A1 * | 10/2020 | Brennenstuhl | G06F 16/367 |
| 2020/0403818 A1 * | 12/2020 | Daredia | G10L 15/26 |

OTHER PUBLICATIONS

Unknown, "Organising Content in Ghost,"—FAQ, https://ghost.org/help/organising-content/ Help Center Support @ Ghost, Jul. 12, 2021.

(Continued)

*Primary Examiner* — Christopher J Raab
(74) *Attorney, Agent, or Firm* — Penilla IP, APC

(57) ABSTRACT

A process for rendering a user interface for a content management system (CMS) includes: providing, over a network, the user interface for rendering through a browser of a client device; the user interface enables configuring a content project including a content model, the content model defining content types for the content project; wherein content entries are defined according to the content types, wherein each content entry is structured in accordance with a given content type, so that multiple content entries are defined from a given content type; wherein the user interface enables a tag to be set in association with any of the plurality of content entries; and wherein the CMS exposes a content delivery API (CDA) that enables, through a single API call to the CDA that references the tag, retrieval of the content entries across the plurality of content types that have the tag set in association therewith.

19 Claims, 14 Drawing Sheets

(56) References Cited

OTHER PUBLICATIONS

Unknown, "Manage Labels," Contentstack account, pp. 1-2, Jul. 12, 2021.
Unknown, "Using Tags," Adobe Experience Manager, https://experienceague.adobe.com/docs/experience-manager-64/authoring/siteandpage/tags.html?lang=en, pp 2-4, Jul. 12, 221.
Unknown, "Add a tag to an item," https://doc.sitecore.com/en/users/101/sitecore-experience-platform/add-a-tag-to-an-item.html, pp. 1-3, Jul. 12, 2021.

* cited by examiner

| | Name | Content Type | Author | Tags ⌃ 706 | Status 708 |
|---|---|---|---|---|---|
| ☐ | Enablement and GTM for tags (internal) | Help Doc | Me | API apple content tags enablement session example tag SEO: api | Changed |
| ☐ | Marketing post NY (2) | Article | Olubu Mack | SEO: api | Published |
| ☐ | Product post SF (1) | Article | Olubu Mack | SEO: api | Published |
| ☐ | Marketing post NY (1) | Article | Olubu Mack | SEO: api | Published |
| ☐ | First post NY (1) | Article | Matthew Hickeyzzzzz | uneek | Draft |
| ☐ | Richard Bausek (1) | Author | Me | enablement session | Changed |
| ☐ | How to add permissions to tags | Help Doc | Me | enablement session | Changed |
| ☐ | How to create an RFC (internal) | Help Doc | Me | enablement session | Changed |
| ☐ | How to remove tags | Help Doc | Me | | Published |
| ☐ | FAQs about Contentful | Help Doc | Me | | Published |
| ☐ | 5 reasons to use tags in your... | Article | Me | | Published |
| ☐ | CMS Tips and Tricks | Help Doc | Me | | Published |
| ☐ | How to create and configure tags | Help Doc | Me | | Published |
| ☐ | Launching tags for Contentful | Article | Me | example tag | Published |

Fig. 7

| | Name | Content Type | Author | Tags ▲ 806 | Status |
|---|---|---|---|---|---|
| ☐ | Enablement and GTM for tags (internal) | Help Doc | Me | [API] [apple] [content tags] [enablement session] [example tag] [SEO: api] | Changed |
| ☐ | Marketing post NY (2) | Article | Olubu Mack | [SEO: api] | Published |
| ☐ | Product post SF (1) | Article | Olubu Mack | [SEO: api] | Published |
| ☐ | Marketing post NY (1) | Article | Olubu Mack | [SEO: api] | Published |
| ☐ | First post NY (1) | Article | | | |

SDKs Test Organization

Space home | Content model | Content | Media | Apps | Settings

Content type | Any ▼ | Tags | [SEO: api] | Type to search for entries | Filter | Save as view ◀— 802 | Usage: 60 / 5000000 entries and assets | Add entry ▼

◀— 800

5 entries found ◀— 804

Scheduled Content

Shared views — My views
- All
- SF Articles
- Product NY
- Marketing NY
- NY Articles
- Marketing SF
- Complex Query helps...

Sorted by created

▼ STATUS (4)
- Published
- Changed
- Draft
- Archived

⊞ Add Folder

Tags

SDKs Test Organization

Space home | Content model | Content | Media | Apps ▽ | Settings ▽

Search for tags — 1100

| Sort by Newest ▽ — 1102 | | Visibility Any — 1106 | Create Tag — 1108 |
|---|---|---|---|
| Tag name | Tag ID — 1104 | Date added | |
| Variant A Tag | PUBLIC  VariantATag | 38 minutes ago | ⋯ |
| uneek | uneek | Mar 18, 2021 | ⋯ |
| SEO.api | PUBLIC  seoApi | Mar 11, 2021 | ⋯ |
| enablement session | enablementSession | Mar 11, 2021 | ⋯ |
| example tag | exampleTag | Mar 11, 2021 | ⋯ |
| apple | apple | Mar 10, 2021 | ⋯ |
| folder | folder | Mar 10, 2021 | ⋯ |
| API | PUBLIC  api | Mar 5, 2021 | ⋯ |
| Content tags | contentTags | Mar 24, 2021 | ⋯ |
| Tags launch | tagsLaunch | Feb 24, 2021 | ⋯ |

View 25 ▽    Showing 1-10 of 10  Previous  Next

Give feedback  10/500

SDKs Test Organization | Space home | Content model | Content | Media | Apps ▾ | Settings ▾

Give feedback | Save Changes

Customer Education* ← 1200

Role detail  Content  Media  Permissions

Content
Add allow and deny rules to define this role's access to content. Anything that's not explicitly allowed is denied. Learn more

Filter rules by
[Actions (all) ▾]  [Entries (all) ▾]  [Content Types (all) ▾]

Allowed
Users with this role can:

[All actions ▾]  [Entries created by user ▾]  [All content types ▾]  🗑 Delete rule  ← 1202

[Read ▾]  [Any entry ▾]  [All content types ▾]  [Tagged example tag ▾]  🗑 Delete rule  ← 1204

[Edit ▾]  [Any entry ▾]  [All content types ▾]  [All fields and tags ▾]  [All locales ▾]  🗑 Delete rule

[Publish/Unpublished ▾]  [Any entry ▾]  [All content types ▾]  [Tagged example tag ▾]  + With tags  🗑 Delete rule New  [Archive/Unarchive ▾]  [Any entry ▾]  [All content types ▾]  [Tagged example tag ▾]  🗑 Delete rule  ← 1206

New allow rule

Denied
Users with this role can not:

New deny rule

ID 100, in accordance with implementations of the disclosure.

TAGS AND PERMISSIONS IN A CONTENT MANAGEMENT SYSTEM

CLAIM OF PRIORITY

This application claims priority as a Continuation and the benefit of U.S. patent application Ser. No. 17/386,456, filed on Jul. 27, 2021, entitled "TAGS AND PERMISSIONS IN A CONTENT MANAGEMENT SYSTEM," which is a further continuation of U.S. patent application Ser. No. 17/386,286, filed on Jul. 27, 2021, entitled "TAGS AND PERMISSIONS IN A CONTENT MANAGEMENT SYSTEM," the disclosures of which are incorporated herein by reference in their entirety for all purposes.

BACKGROUND

1. Field of the Disclosure

The present disclosure relates to methods and systems for providing tagging of structured content in a content management system.

2. Description of the Related Art

A content management system (CMS) is useful for enabling organizations to create and edit digital content in a structured manner A given organization's content can be broken down into modular, reusable components, enabling deployment of content in a variety of combinations to suit different presentation contexts. Further, the appearance of content can be adjusted to suit the presentation context at the time it is retrieved and presented to the consuming end user.

In the implementation of a CMS, content is developed in a structured manner that provides great flexibility in terms of content management, re-use and deployment. However, the hierarchy of structured content for a given project can be very complex, and there can be a very large number of individual content entities, making it difficult to find and obtain content without complicated navigation or deep understanding of the content hierarchy.

It is in this context that implementations of the disclosure arise.

SUMMARY

Implementations of the present disclosure include methods and systems relating to tagging of content in a content management system (CMS).

In one embodiment, a content management system (CMS) that enables storage and retrieval of structured content is disclosed. The CMS includes means for configuring a content project. The content project includes a content model, and the content model defines a plurality of content types for the content project. The CMS includes a plurality of content entries defined according to the content types. Each content entry is structured in accordance with a given content type from which the content entry is defined. Multiple content entries are defined from a given content type. The CMS includes at least one tag configured to be set in association with any of the plurality of content entries. The method includes means for exposing a content delivery API (CDA) configured to enable, through a single API call to the CDA that references the tag, retrieval of the content entries across the plurality of content types that have the tag set in association therewith.

In another embodiment, a method for processing retrieval of structured content using a content management system (CMS) is disclosed. The method includes processing input for configuring a content project, and said content project includes a content model. The content model defines a plurality of content types for the content project. The method includes accessing a plurality of content entries defined according to the content types. Each content entry is structured in accordance with a given content type from which the content entry is defined. Multiple content entries are defined from a given content type. The method includes processing at least one tag to be set in association with any of the plurality of content entries. The method includes receiving a single API call via a content delivery API (CDA). The single API call is configured to reference the tag via the CDA. The retrieving of the content entries is across the plurality of content types that have the tag set in association therewith.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 7 illustrates an editor interface displaying a listing of content having tags associated therewith, in accordance with implementations of the disclosure.

FIG. 8 illustrates an editorial interface showing content entries filtered by tag in a CMS, in accordance with implementations of the disclosure.

FIG. 9A illustrates an editorial interface for editing a content entry in a CMS, in accordance with implementations of the disclosure.

FIG. 9B illustrates an editorial interface for editing tags associated with a content entry, in accordance with the implementation of FIG. 9A.

FIG. 10 illustrates an editorial interface for bulk addition of tags to content entries, in accordance with implementations of the disclosure.

FIG. 11 illustrates a centralized tag management interface page, in accordance with implementations of the disclosure.

FIG. 12 illustrates an interface for editing a user role with permissions based on tags, in accordance with implementations of the disclosure.

DETAILED DESCRIPTION

The following implementations of the present disclosure provide methods and systems relating to tagging of content in a content management system. It will be obvious, however, to one skilled in the art, that the present disclosure may be practiced without some or all of the specific details presently described. In other instances, well known process operations have not been described in detail in order not to unnecessarily obscure the present disclosure.

Broadly speaking, implementations of the present disclosure provide mechanisms to enable customers of a CMS to set tags in association with structured content of the CMS. Tags are defined as entities within a given content project, which can be associated with the structured content in ways that transcend the hierarchical structuring of the content as it is organized in the CMS. This provides many advantages, enabling more intuitive and efficient access to content for both editing and content delivery purposes. The tags implemented in accordance with embodiments of the present disclosure further enable permission setting for user-defined roles based on such tags. In general, tags implemented in a CMS in accordance with implementations of the disclosure provide a flexible system for managing and deploying content.

Figure 1:
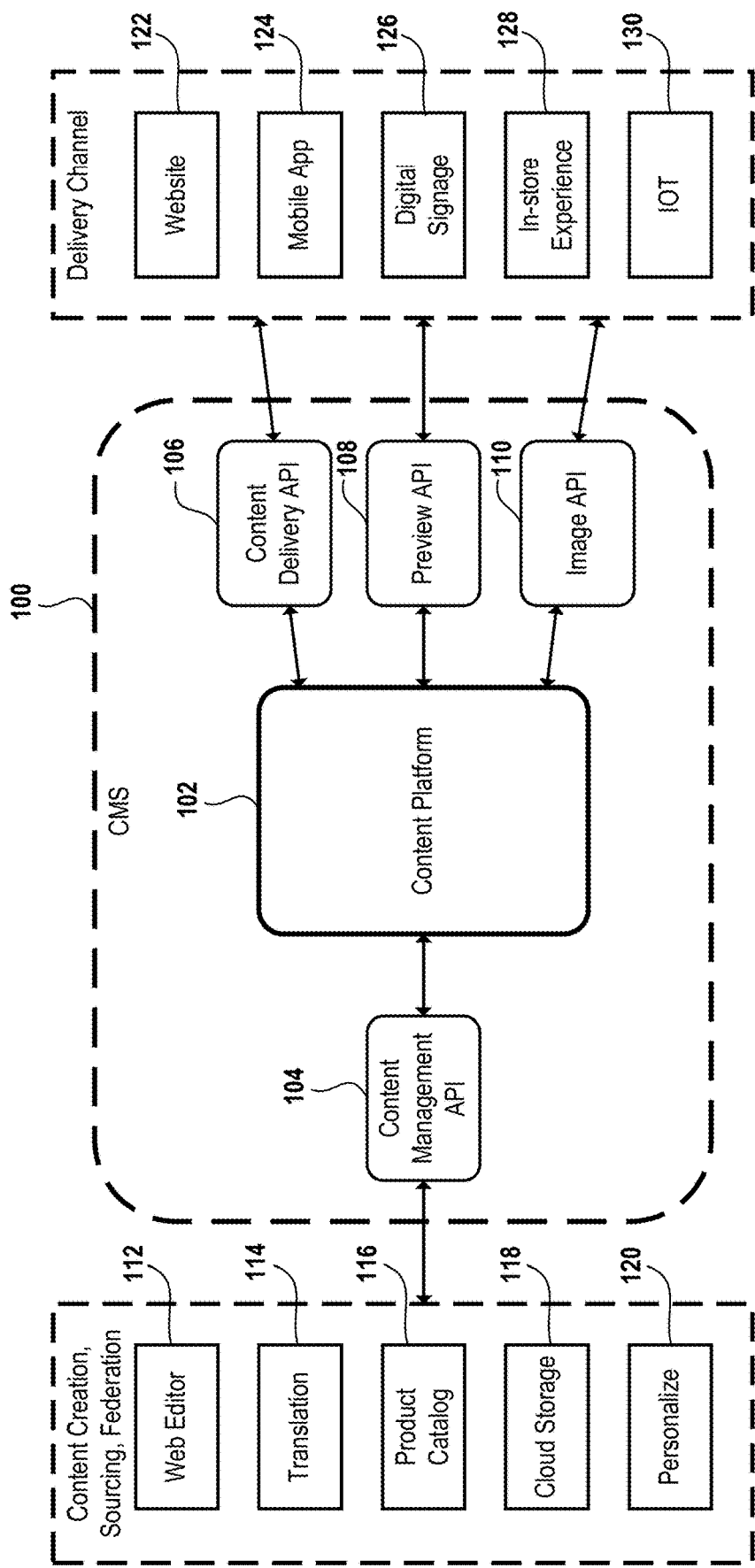
FIG. 1 conceptually illustrates a content management system (CMS) 100, and entities that interact with the CMS 100, in accordance with implementations of the disclosure.

FIG. 1 conceptually illustrates a content management system (CMS) 100, and entities that interact with the CMS 100, in accordance with implementations of the disclosure.

Broadly speaking, a content management system (CMS) is a system that facilitates and manages the creation, storage, editing, and delivery of digital content. One example of a CMS is provided by Contentful GmbH (https://www.contentful.com). In a CMS in accordance with implementations of the disclosure, content can be distinguished from the context/channel in which such content is presented. That is, content is modularized and separated from its appearance in a given presentation context through which the content is presented and actually consumed by the end user. Examples of presentation contexts include websites, mobile apps, digital signage, in-store digital experiences, etc.

Content generally consists of content items which can be of various types. Examples of types of content items include text, images, audio, video, data values, etc. Content items are typically stored as data structures in the CMS (e.g., JSON data structures containing text, metadata, links, tags, etc.), and in some implementations, include raw text, media, or data files. Hence, content is stored and delivered in a generic format, and formatting is later applied in the end application that defines the presentation context. For example, appearance determinations such as fonts, colors, alignment, etc. are applied to text or media content items by a website or mobile app. Thus, the final appearance of content is not determined at its creation, but rather is dynamically determined by the context in which the content will appear.

Content items can be flexibly configured to enable specific content items for specific purposes to be defined. For example, the content items which comprise a typical rendering of a news article by a newspaper/publication may include the following: title of the newspaper/publication, place/location, date, copyright information, article title, subtitle, author, body, photo/image, photographer name, photo/ image caption, etc. Each of these content items can be separately stored and independently delivered as needed to suit different contexts of presentation. For example, a news article appearing on a news website will be configured to present the article in a different format/style than when the same article appears in a social media feed, on a digital sign, or in another context.

Broadly speaking, the CMS 100 provides a content platform 102 to unify and structure content for improved content management and delivery. Access to and management of the content is provided through various application programming interfaces (API's). In some implementations, creation, editing, federation and other management of content is mediated through a content management API 104. In some implementations, the content management API 104 is a read-write API for managing content. In some implementations, the content management API 104 requires authentication as a user of the CMS. The content management API 104 enables one to programmatically create or update content items. It will be appreciated that the content management API 104 can be used for a variety of purposes, including by way of example without limitation, creation and editing of content in the content platform, automatic imports from other content sources/repositories, integration with other backend systems (e.g., an e-commerce shop), building custom editing experiences, creating/updating tags and associating content items with tags, etc.

For example, a web editor 112 is implemented to provide a web-based user interface for creating and editing content, the web editor accessing the content management API to generate new content items in the system, retrieve and edit existing content items, store changes to content items, etc. While a web editor is referenced herein, it will be appreciated that other applications can be configured to implement at least some of the functionality described in relation to the web editor, including customer-built applications, apps that integrate with the web editor, other web apps, etc.

In some implementations, content is localized in part by translation logic 114, which enables translation (in some implementations, causes translations) of the content into the local language of the delivery context. Thus, translation logic 114 may access the content management API 104 to retrieve, generate, and store translations of content in the CMS 100, as well as configure such translations for presentation in the appropriate contexts.

In some implementations, the content platform 102 of the CMS 100 can be integrated with other systems via the content management API 104. In some implementations, content can be sourced/mined/imported from, or synchronized with, an existing repository of content. For example, an existing product catalog 116 may be maintained including information about products such as product names, categorizations, descriptions, price information, related media, etc. and such a product catalog system can be configured to import or update content, or otherwise affect content management actions so as to integrate with the CMS 100 via the content management API 104. In some implementations, a cloud storage system 118 can similarly integrate with the CMS 100 via the content management API 104.

In some implementations, a personalization system 120 is enabled to affect content personalization via the content management API 104. Personalization information can be utilized to enable customization of content or downstream customization of content delivery. Examples of personalization information can include user demographic information (e.g., age, gender, ethnicity, etc.), geolocation, user content consumption history, user preference information, user purchase history, etc. Such personalization information can be utilized by the personalization system 120 to customize content via the content management API, and the selection and presentation of content through a given context.

As noted, content is separated from its presentation, so that the specific appearance of delivered content is determined by or otherwise based on the downstream context/channel through which the content is delivered (e.g., website, mobile app, digital signage, in-store experience, etc.). To this end, various API's are provided for enabling such presentation contexts/channels to access the CMS to obtain the appropriate content for presentation. For example, a content delivery API 106 is exposed to enable retrieval of content items and delivery of said content items to the presentation context. In some implementations, the content delivery API 106 is configured as a read-only API for delivering content from the CMS 100 to apps, websites and other media. In some implementations, content can be delivered as JSON data, and images, videos and other media as files. The content delivery API 106 can be made available via a globally distributed content delivery network (CDN), so that the server closest to the user serves all content, both JSON and binary. This minimizes latency, which especially benefits potentially bandwidth constrained delivery contexts, such as mobile apps. Hosting content in multiple global data centers also greatly improves the availability of content.

In some implementations, a content preview API 108 is provided, which is a variant of the content delivery API 106 for previewing content before delivering it to live customers. The content preview API 108 can be used in combination with a preview deployment, e.g., preview deployment of a website or a preview build of a mobile app, that allows content managers and authors to view their work in-context, as if it were published, using a preview access token as though it were delivered by the content delivery API 106.

In some implementations, images API 110 is provided, enabling image transformations/adjustments, such as resizing and cropping of images, changing their background color and converting them to different formats. Using the images API 110 for these transformations allows users to upload high-quality assets, while delivering images suitable and optimized for the delivery channel, and leveraging the benefits of a caching content delivery network.

It will be appreciated that content can be delivered from the CMS 100 to any of various delivery channels/contexts, such as a website 122, mobile app 124, digital signage 126, in-store experience 128, Internet-of-things (IOT) device 130, etc.

In some implementations, the CMS 100 is configured to have the following main entity types: user, organization, space, and environment.

A user is an entity with an account in the CMS. Users can be invited to an existing organization, or sign up individually. If a user has signed up individually, a new organization is automatically created. An existing user can create additional organizations or be invited to other existing organizations. In some implementations, users have management authentication credentials attached to them, such as OAuth applications, OAuth tokens, and personal access tokens.

An organization is an entity that serves as a way to group users and group spaces (content projects). In some implementations, the organization also links member users to a billing entity, so subscriptions and invoices are tied to the organization, rather than to a specific user.

In some implementations, the CMS implements a role-based access model. For example, users can be invited to join an organization and those users will have different levels of access based on their organizational role.

In some implementations of the CMS, a space or a content project is a child of the organization, and serves as a container for the organization's content and any settings related to that content. Spaces allow one to separate data according to the structure of projects or services.

Various settings can apply to a given space or content project. For example, users of a space can be defined as members of the parent organization who belong to the space, and their respective access roles can be defined. Roles and permissions can be defined to set user access levels within the space. API keys can be defined, so that in order to retrieve content through one of the CMS's APIs, a key has to be provided for authentication. For example, in some implementations, an API key is required to be provided in order to access published content through the content delivery API or to access unpublished content through the preview API. Webhooks can be configured to send requests (e.g., HTTP requests) triggered by changes to a content model, content, or media. Content preview functionality is supported, providing a link within the entry editor to a pre-production environment that uses the preview API to access unpublished content.

In some implementations of the CMS, environments are defined as entities within a space that allow one to create and maintain multiple versions of the space-specific data and configuration, and make changes to them in isolation. Hence, in some implementations, each space has one environment by default, which may be termed a master environment. Additionally, multiple sandbox environments can be created. These sandbox environments allow one to modify the data in a space without affecting the data in the master environment. In some implementations, an environment alias can be implemented to allow one to access and modify the data of a target environment, through a different static identifier. For example, a master alias ID can be implemented to reference or point to the environment that is deemed to be the current production version, and accordingly API calls using the master alias ID will access the referenced environment. It will be appreciated that the master alias ID can be easily switched to another environment as needed, conveniently facilitating rollout of a new version of content or rollback to a prior version.

In some implementations, environments include a content model, content, and media. The content model is a collection of content types, which define the structure of the content. The content is defined as a collection of entries. Media is defined as a collection of assets.

A plurality of settings can apply to environments. For example, in some implementations, there are locales settings to manage and deliver content in multiple languages, or otherwise customize content delivery based on delivery geolocation. In some implementations, user interface (UI) extensions are supported, to enable building of customized editing experiences for the web editor. In some implementations, app installations are supported, extending and expanding the capabilities of the CMS web application.

Figure 2:
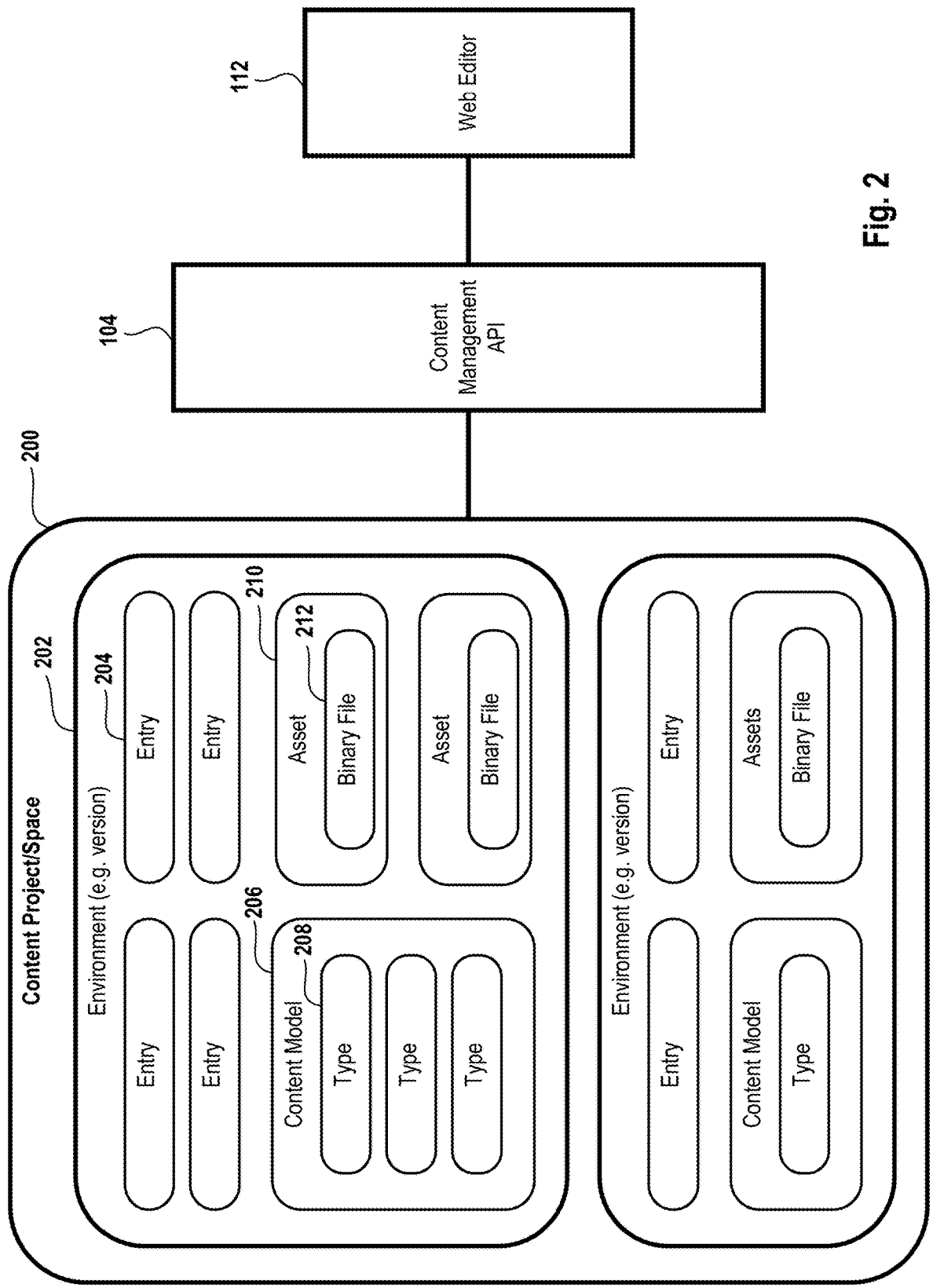
FIG. 2 conceptually illustrates a content project (also termed a space), in accordance with implementations of the disclosure.

FIG. 2 conceptually illustrates a content project (also termed a space), in accordance with implementations of the disclosure.

In the illustrated implementation, content is organized in content projects, such as an exemplary content project 200, that groups together all the related resources for a given project. This can include content entries, media assets, and settings for localizing content into different languages. Each content project has a content model that represents and defines the content types one can create for the content project.

In some implementations, all content types have standard fields that contain basic information about the content type, its fields and meta data (e.g., system properties, name of the content type, description of the content type, listing of fields, ID of main field used for display, etc.). Each content type is flexibly configurable, further consisting of user-defined fields, which in some implementations, correspond to a JSON type (e.g., string, number, object, boolean, array). Examples of user-defined fields include the following: text, number, date and time, location (coordinates), boolean, media (links to an asset), reference (links to an entry or object), array, JSON object. It will be appreciated that array fields can contain multiple values which can include strings, links to other entries or assets, etc. An array field may have an items property defining the allowed values in the array. Individual fields can also contain metadata, such as validations and widget appearance.

Individual items of content are stored in the CMS as entries (e.g., entry 204), which represent textual or structural information based on the content type used. Items can also be assets (e.g., asset 210), which can include binary files (e.g., binary file 212), such as images, videos or documents, along with metadata. In some implementations, assets have the following fields: the name, description and attached file.

In summary, a content project contains all the content that is functional to one project, and an environment is a way to express one version of one project. An example use case for multiple environments as part of a given content project would be a scenario in which there is a current version of one's website and a future holiday version of the website that is not in production yet, but is being worked on. There can be a first environment that contains the content for the current version being actively served to customers, while in parallel work is proceeding on a second environment which is for the future holiday version to be released.

Further, content in a given environment of a content project consists of entries and assets, with each entry being of a user-defined type that specifies the fields of a given entry. Thus, each entry is a unit of content in the system of a type that is flexibly defined by the user and capable of being adapted to suit a given purpose.

For purposes of illustration, an example of a content model for a product catalogue might include content types for a category (identifying what product type), a brand (identifying who made the product), and a product (an item for sale that references a category and a brand). Further, the brand content type might consist of several fields, such as a company name, logo, description, electronic contact information (website, social media, email address), phone number, etc.

Entries can have link (or reference) fields which point to other entries or assets. An example use case for a restaurant might include the following: a restaurant linking to its menu (singular relationship), a menu linking to its specific menu items (plural relationship), each menu item linking to a photo (attachment), a restaurant linking to multiple photos (attachments). The content delivery API can be structured so that a single HTTP request retrieves the entire set of linked resources above, starting with the menu, in one request. A CDN can cache these requests to further speed up future requests. This is useful for consuming apps (and especially mobile apps) as it reduces the need for multiple concurrent connections or servicing of serially dependent requests, and reduces the latency for results to return.

Links also provide additional advantages in that relationships are clearly defined and validated by specific content type fields. Entry links can be validated by content type (e.g., only allow Menu Items for fields.menuItems). Asset links can be validated by file type. (e.g., only allow Images for fields.photo). Links on the Content Delivery API are resolved using the published entries and assets, while links on the Content Preview API will resolve using the draft entries and assets.

Figure 3:
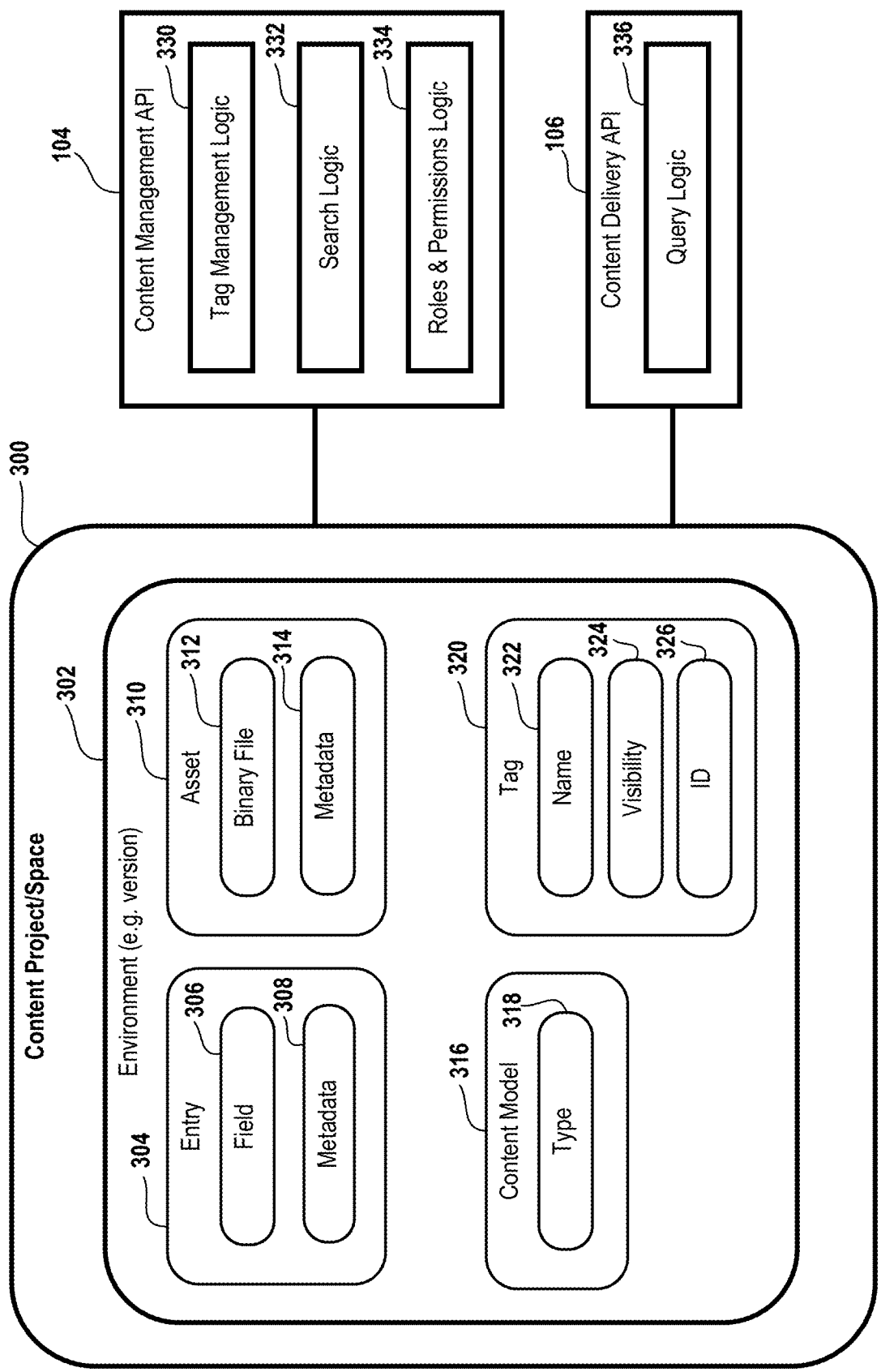
FIG. 3 conceptually illustrates a system for providing tagging of content in a CMS, in accordance with implementations of the disclosure.

FIG. 3 conceptually illustrates a system for providing tagging of content in a CMS, in accordance with implementations of the disclosure.

The concept of a tag in a CMS is provided for herein. A tag is an entity defined for a content project/space, which can be associated or assigned to content entries or assets within the content project or specific environment. Tags are useful for organizational purposes and for searching for content entries and assets, for example, using the web editor. In the illustrated implementation, a content space 300 is conceptually shown, including an environment 302. A representative entry 304 includes fields 306 and may further have metadata 308 associated therewith. A representative asset 310 may include or reference a binary file 312, and also have metadata 314 associated therewith. A content model 316 defines the content types 318 from which the content entries are defined, as has been described.

A representative tag 320 is further shown. The tag 320 includes a name 322, a visibility setting 324, and an identifier (ID) 326, each of which is customizable by an administrator or user with permission to create or edit tags in the content space 300. The name 322 of the tag is a human-readable unique identifier for the tag 320, such as text that will be displayed when the tag 320 is surfaced. This is distinguished from the ID 326, which is a unique identifier for referencing the tag 320.

The tag visibility setting 324 defines whether the tag is private or public. Private tags can only be viewed by users with relevant permissions within a space, and are accessible through the content management API 104, but not the content delivery API 106. Whereas, public tags are visible within the space, as well, but are also accessible through the content delivery API. Thus, public tags can be returned to client-side apps via the content delivery API, which is useful for grouping content regardless of content type and enabling querying such grouped entries or assets from client-side applications. In some implementations, by default, the tag visibility setting 324 is set to be private, so as to avoid exposure through the CDA 106 unless affirmatively chosen. In some implementations, the tag visibility setting 324 is additive in the sense that changing the tag visibility setting from its default setting will make the tag additionally accessible via the CDA 106 and/or CPA 108, as opposed to only the CMA 104 by default.

It will be appreciated that tags are entities existing alongside content entries and assets, and the content model of a given environment or content space. Notably, a tag is not a content field of a content entry or asset, but can be added to a content entry or asset as a form of metadata. Thus, tag 320 can be assigned to content entry 304 as metadata 308. Or tag 320 can be assigned to asset 310 as metadata 314. In some implementations, the metadata of a given content entry or asset is configured to include a list of tags containing links to the tags that exist on the entry or asset.

The CMA 104 implements tag management logic 330 for creating, editing and managing tags. Generally, an administrator will create and edit the tags for a given space or environment, for example, creating a tag taxonomy that is appropriate for the content project. However, user roles can be defined which are also permitted to create tags, for example, for a given environment.

The tag management logic 330 of the CMA 104 is also configured to enable assignment or association of tags to specific content entries and assets. It will be appreciated that such can be performed by users having the relevant permissions, such as administrators and other user roles configured to manage the association of tags to entries/assets, such as content editor roles. In some implementations, bulk tagging for multiple entries at a time is provided.

The CMA 104 further implements search logic 332 which enables searching for content entries and assets based on tags. Content editors and developers can perform searches for content entries and assets having specified tags, and this provides faster and more intuitive location of content that is relevant for them.

The CMA 104 further implements roles & permissions logic 334, which enables setting of roles having permissions defined based on tags. For example, a user role can be defined for which the user role is permitted to edit content entries having a specific tag.

As noted, public tags are exposed in both the CMA 104 and the CDA 106. As shown in the illustrated implementation, the CDA 106 implements query logic that enables querying of content through the CDA 106 using public tags. Significantly, because tags are independent of content type, querying across different content types with a single API call is enabled, providing efficient access to content of different content types. It will be appreciated that various types of queries for content based on tags can be supported. One example is as a query to retrieve entries or assets that match a specific set of tag values, which returns a list of entries/assets with tags that match the specified set of tag ID's. Another example is a query to retrieve entries or assets that match at least one of a set of specified tag values, which returns a list of entries/assets with tags that match one or more of the specified tag ID's in the set. Yet another example is a query that checks the presence of a tag on entries or assets, which returns all entries that have tags in them. Additionally, the CDA 106 can support queries to obtain some or all the tags in a given content space/project, which returns some or all of the public tags in the environment that are accessible through the CDA 106.

Figure 4:
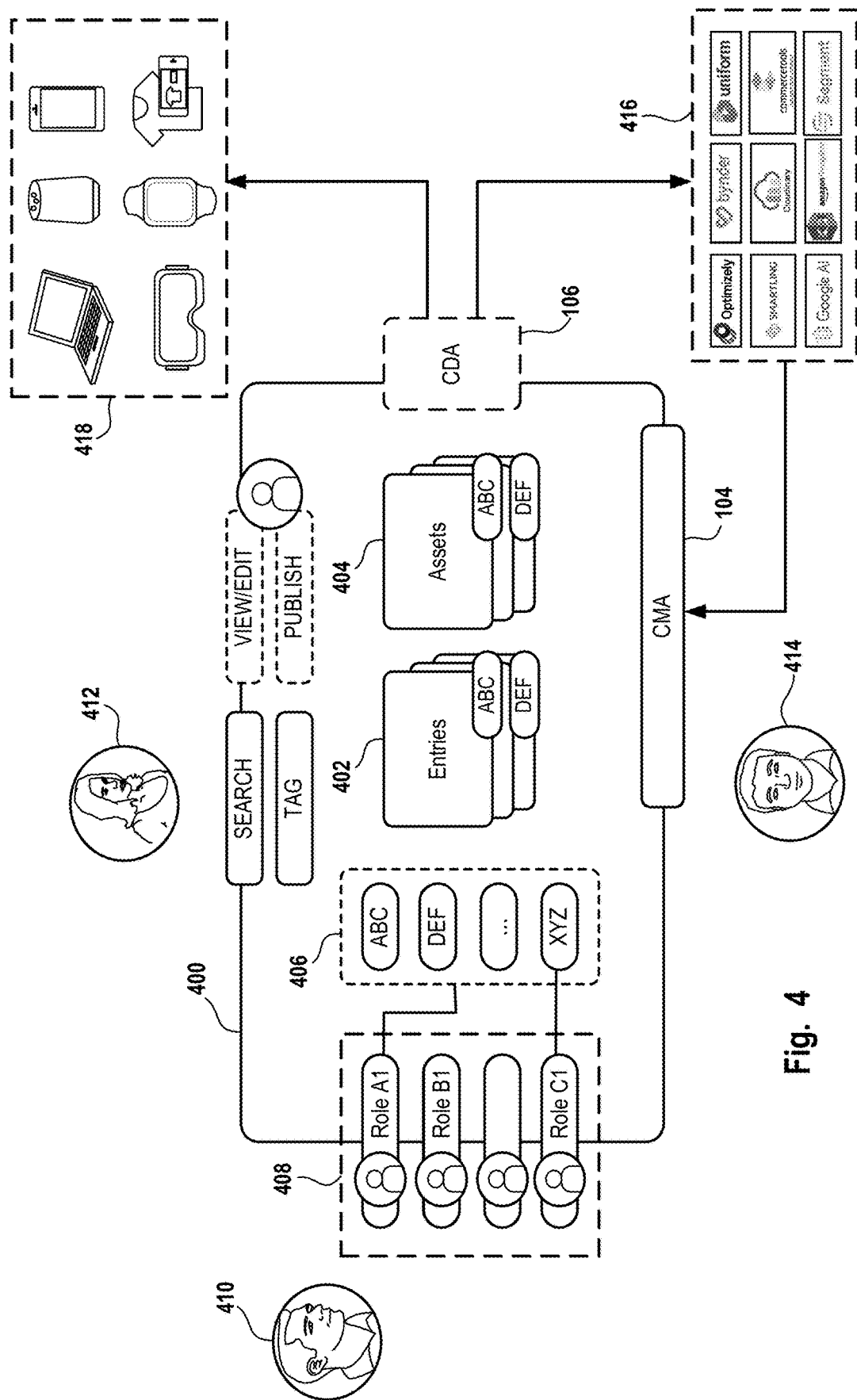
FIG. 4 conceptually illustrates implementation of tagging and tag-based user roles and permissions in a CMS, in accordance with implementations of the disclosure.

FIG. 4 conceptually illustrates implementation of tagging and tag-based user roles and permissions in a CMS, in accordance with implementations of the disclosure.

In the illustrated implementation, a content project 400 is conceptually shown, including entries 402 and assets 404. Administrators 410 are able to create tags 406 for the content project 400, for example, defining a tag taxonomy and centrally managing tags.

Administrators 410 can also manage tags to enforce permissions and limit access on a group of entries/assets through the implementation of user roles 408 that are based on the tags 406. That is, user roles can be defined with tag-based permissions or restrictions as part of the user roles. By way of example without limitation, a given user role "A1" can be defined, without permission to assign tags, and with permission to view or edit only entries having a specific tag, such as tag "ABC" in the illustrated implementation. Thus, any user with role "A1" may only access those ones of the entries 402 or assets 404 that have been tagged with "ABC." Furthermore, when any entries or assets are tagged with "ABC" by an administrator or other authorized user, then the newly tagged entries/assets automatically become accessible to the user with role "A1." Likewise, removal of the tag "ABC" from a given entry or asset will automatically revoke the user's access to the entry or asset. Thus, tag-based permissions and restrictions in a CMS can provide a highly configurable way to control access to the structured content of the CMS.

Content creators 412 can apply the tags 406 to relevant ones of the entries 402 or assets 404, and conduct searches for entries and assets using tags to more easily find the relevant entries/assets for their work. In some implementations, tag-based searches can be saved for easy retrieval of content.

Developers 414 involved in developing integrations of services 416, and developing digital experience systems 418, can leverage tags to access and query content more efficiently through the APIs of the CMS, such as the CMA 104, CDA 106, and CPA 108.

It will be appreciated that the digital experience systems 418 can include any of the aforementioned presentation contexts through which content of the CMS is presented to end users, such as a website, mobile app, in-store experience, virtual reality experience, smart speaker. These digital experience systems can be configured to query and retrieve content via tag-based API calls through the CDA 106 in accordance with implementations of the disclosure.

The services 416 provide added functionality from other platforms to enable integration of features and functionality to users of the CMS. By way of example without limitation, such services can include processing services, analytics, additional data repository systems, etc. The services 416 can be configured to implement tag-based queries for content through the CDA 106, and may further implement tag-based queries and tag-based content management through the CMA 104.

Figure 5:
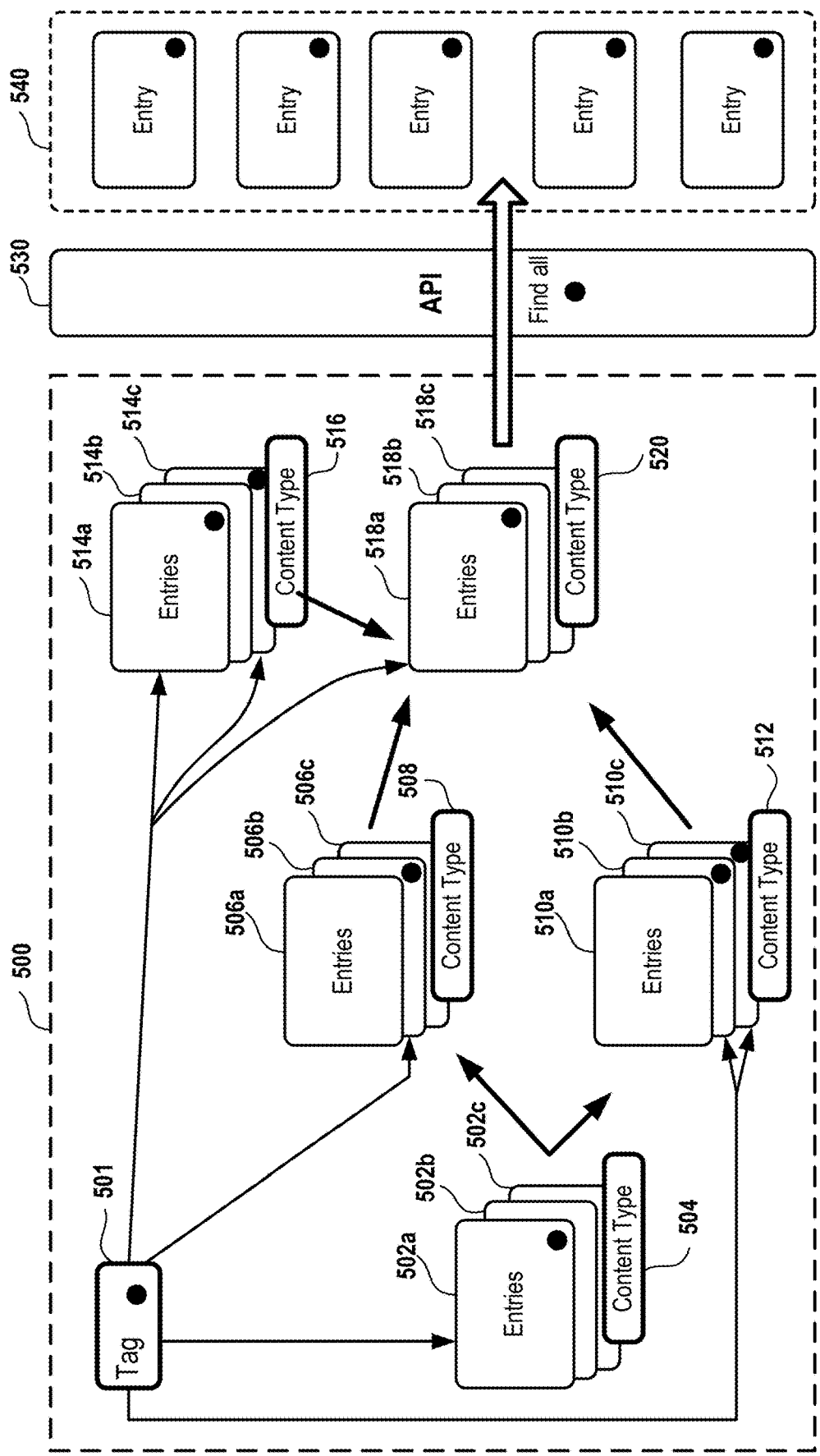
FIG. 5 conceptually illustrates querying by a tag in a CMS, in accordance with implementations of the disclosure.

FIG. 5 conceptually illustrates querying by a tag in a CMS, in accordance with implementations of the disclosure.

In the illustrated implementation, a content project 500 is conceptually shown, including various entries which are defined from various content types. More specifically, the content entries 502a, 502b, and 502c are defined from a content type 504; the content entries 506a, 506b, and 506c are defined from a content type 508; the content entries 510a, 510b, and 510c are defined from a content type 512; the content entries 514a, 514b, and 514c are defined from a content type 516; the content entries 518a, 518b, and 518c are defined from a content type 520.

It will be appreciated that content types can be configured to reference other content types, so that content entries of a given type may reference other content entries of another content type. This is conceptually illustrated in the content project 500 wherein content type 504 is configured to reference content types 508 and 512, and content types 508, 512, and 516 are configured to reference content type 520. Thus, some of content entries 502a/b/c may reference some of content entries 506a/b/c and 510a/b/c, and some of content entries 506a/b/c and 510a/b/c and 514a/b/c may reference some of content entries 518a/b/c. As shown, the various content types can be visualized as a graph or tree structure, wherein each node is a content type that may reference other content types.

A tag 501 is also defined for the content project 500. The tag 501 is not a field of any particular content type, but is independently defined in the content project 500, and thereby applicable for assignment to content entries across different content types as a form of metadata. By way of example in the illustrated implementation, the tag 501 has been assigned to the specific content entries 502a, 506b, 510b, 510c, 514a, 514c, and 518a, which includes entries of various different content types. It will further be appreciated that content entries that might otherwise not be related to each other through the content model of the content project, can share an association via tagging.

Tagging of content entries in a CMS enables powerful search and querying capabilities. Using a single API call, tagged entries can be fetched/retrieved from any content type (or node in the graph). In the illustrated implementation, a single API call through an API 530 (e.g., CMA, CDA, or CPA) can be configured to fetch all the content entries of the content project 500 that have been tagged with the tag 501, which are retrieved as the entries 540 as conceptually shown.

In the absence of tagging, one might attempt to use conditional query filters to find entries across different content types (for example, in a search bar/tool of the web editor/app, and/or in the content management API). However, this may be reliant upon specific search parameters, and may require navigation and understanding of the hierarchy of content entries in order to locate relevant content entries across different content types. Complex structured queries are typically required, and multiple iterations of such queries may be required as well. This can require multiple API calls thereby consuming resources of the CMS and creating network traffic and occupying network service capacity of the CMS. By contrast, with tag-based queries, a single API call is capable of fetching relevant content entries from different content types in a simplified manner, reducing network traffic by reducing the number of API calls needed to obtain relevant content, and reducing the associated resource burden on the CMS.

Tags can provide a convenient mechanism for editorial control over which content is delivered in response to a given API call. By simply changing the assignment of tags, a given API call for tagged entries will return different results.

Figure 6:
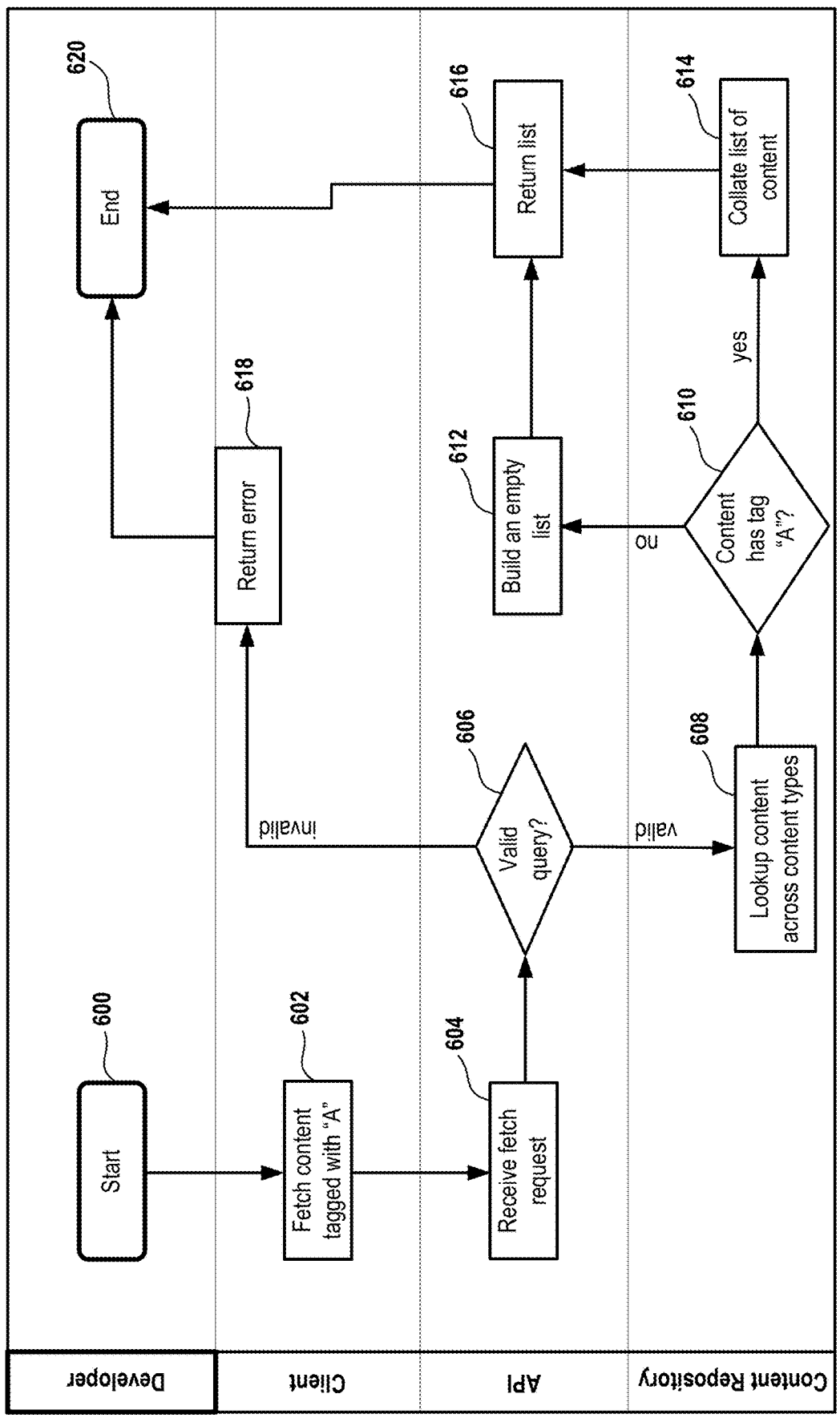
FIG. 6 conceptually illustrates a method for querying tagged content in a CMS, in accordance with implementations of the disclosure.

FIG. 6 conceptually illustrates a method for querying tagged content in a CMS, in accordance with implementations of the disclosure.

The method initiates at method operation 600, by a requestor operating a client in the illustrated implementation. The requestor may be a developer as shown in the illustrated implementation, or other parties or entities such as an administrator, editor, service, digital experience system, etc. capable of initiating the method. In some implementations, the requestor is the client itself or otherwise integrated with the client. At method operation 602, the client initiates a request to fetch content tagged with a tag "A." At method operation 604, the API of the CMS receives the fetch request.

At method operation 606, the API determines whether the fetch request defines a valid query. If the query is invalid, then at method operation 608, an error is returned via the client and the method ends at method operation 620. If at method operation 606 the query is valid, then at method operation 608, a lookup is performed in the content repository of the CMS for content tagged with tag "A" across the various possible content types.

At method operation 610, it is determined whether content tagged with tag "A" is found. If no, then at method operation 612, an empty list is built by the API and returned at method operation 616. If at method operation 610 content tagged with tag "A" is found, then at method operation 614, a list of the tagged content is collated, and at method operation 616, the list is returned to the developer, and the method ends at operation 620.

FIG. 7 illustrates an editor interface displaying a listing of content having tags associated therewith, in accordance with implementations of the disclosure.

In the illustrated implementation, a listing 700 of content entries is shown in the editor interface, which may be provided through a web editor app for editing content of the CMS. The names of the content entries are shown at reference 701. The content types of the content entries are shown at reference 702. The authors of the content entries are shown at reference 704. The tags associated with the content entries are shown at reference 706. The statuses of the content entries are shown at reference 708.

As can be seen, a given content entry can have zero, one, or more than one tag assigned to the content entry. Furthermore, it is noted that because a tag exists independent of the fields of the content entry, there is no ambiguity regarding the applicability of the tag to the content entry. For a content entry may be in draft status, and this can create uncertainty about whether a field is complete or applicable. However, with tags that do not constitute a field of the entry, such tags can apply to content entries regardless of their status, whether draft or published or otherwise.

FIG. 8 illustrates an editorial interface showing content entries filtered by tag in a CMS, in accordance with implementations of the disclosure.

In the illustrated implementation, a search/filter field 800 is provided in the interface, by which searches/filtering for content based on tags can be defined. In the illustrated implementation, the filter has been defined to show any content type that is tagged with the tag "SEO:api." Furthermore, a "Save as view" feature 802 enables saving of the searches/filters as a predefined view, which can be easily retrieved later so that the search/filter query can be easily performed without having to reconfigure it again.

The results of the filtering by tag is shown in the listing 804 of content entries. As indicated at reference 806, the listing 804 includes those content entries that have been tagged with the "SEO:api" tag.

Figure 9A:
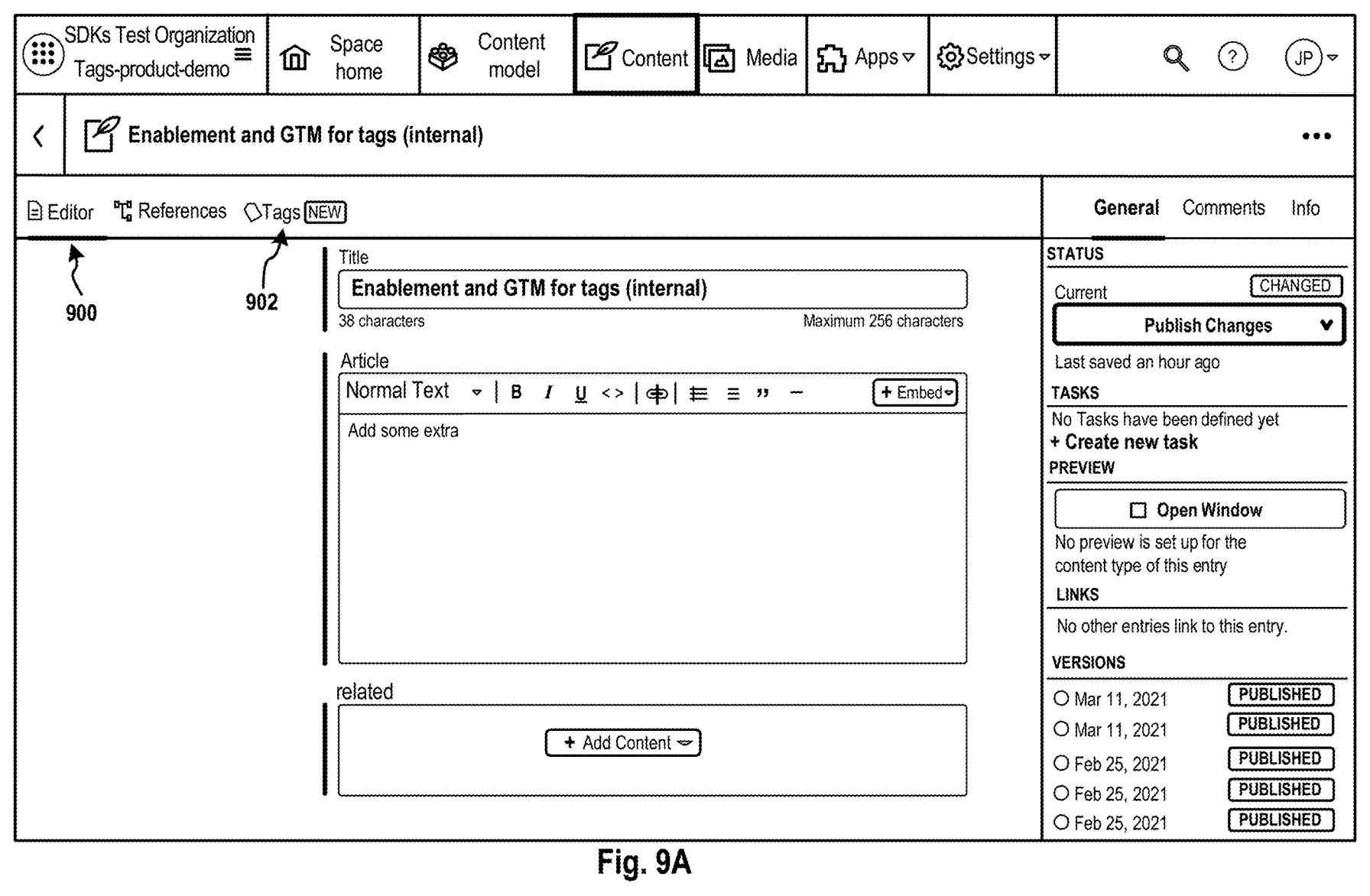

FIG. 9A illustrates an editorial interface for editing a content entry in a CMS, in accordance with implementations of the disclosure.

In the illustrated implementation, an Editor tab 900 is selected, which thereby provides access to editable fields of the content entry.

Figure 9B:
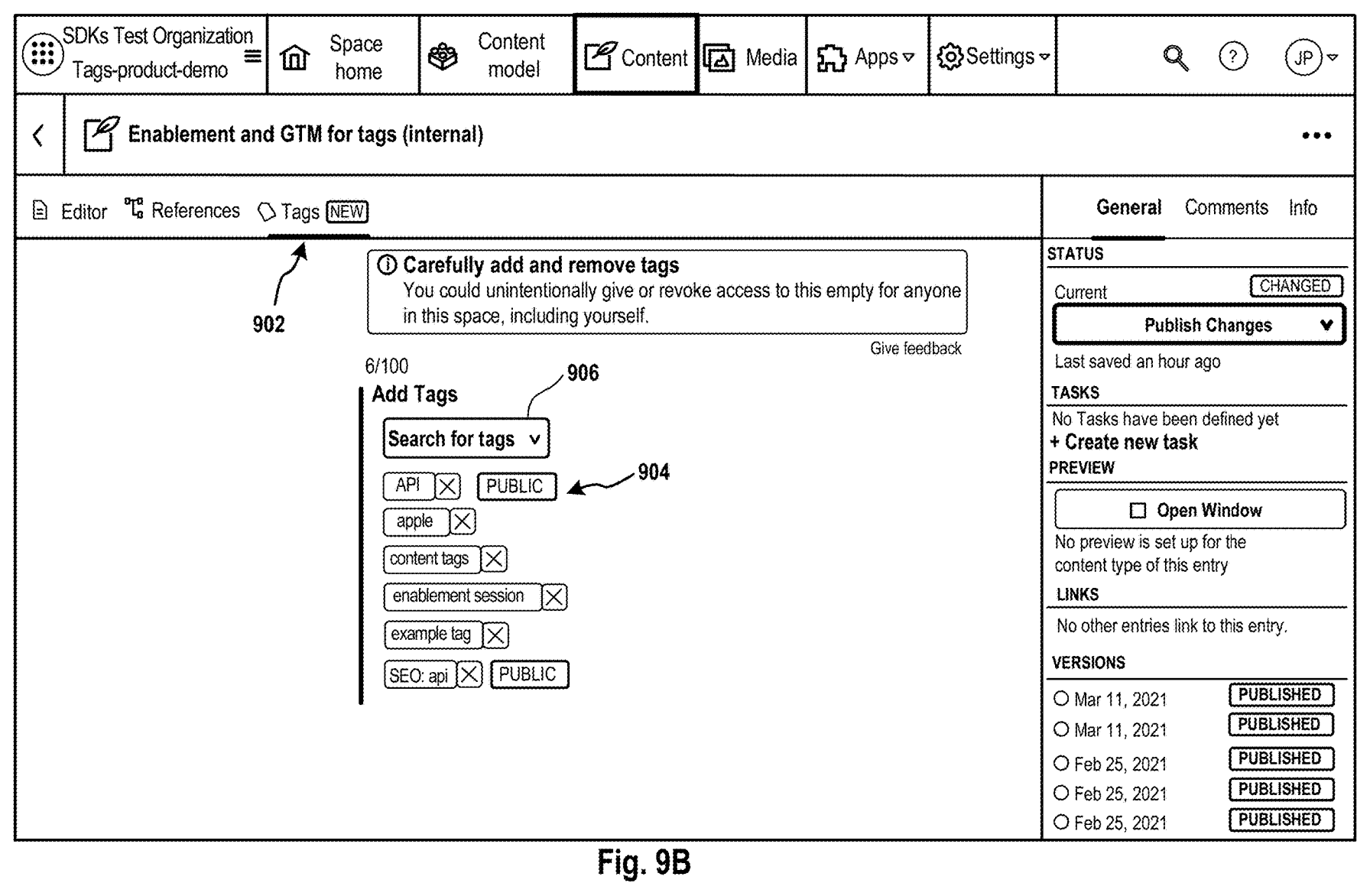

FIG. 9B illustrates an editorial interface for editing tags associated with a content entry, in accordance with the implementation of FIG. 9A.

As shown in FIG. 9B, a Tags tab 902 is selected for viewing, revealing an editable listing of tags 904 that are associated with the content entry. In the illustrated implementation, tags are private by default, and tags that are public are further labeled as "PUBLIC" as shown.

A search field 906 is provided for searching for tags, which can be applied to the content entry.

Figure 10:
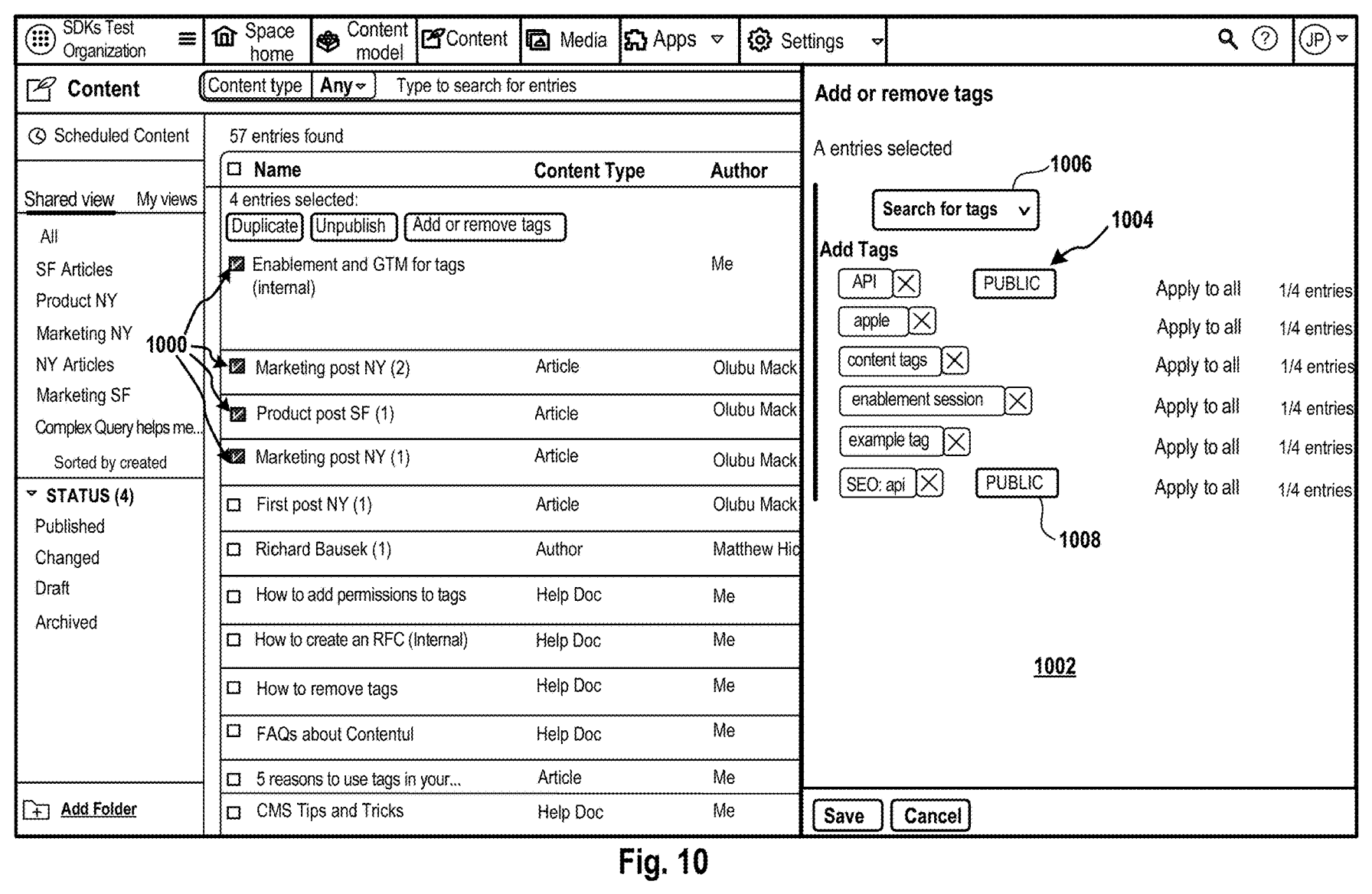

FIG. 10 illustrates an editorial interface for bulk addition of tags to content entries, in accordance with implementations of the disclosure.

In the illustrated implementation, several content entries have been selected as shown at reference 1000, and a sidebar interface 1002 for bulk editing of tags of the selected content entries is displayed. A listing of tags 1004 shows the tags currently assigned to the selected entries. In some cases, a given tag may be assigned to only some of the selected entries, and thus the view displays the number of entries out of the selected entries that have a given tag. An option to "Apply to all" is provided for those tags that are not assigned to all of the selected entries.

A search field 1006 enables searching for tags which can then be added to the selected content entries.

It is noted that tags that are public are designated with the "PUBLIC" label, so that an editor understands that the entries will be accessible via the CDA/CPA using such a tag.

FIG. 11 illustrates a centralized tag management interface page, in accordance with implementations of the disclosure.

In some implementations, the illustrated interface is provided to an administrator or other user with specific permission to edit the tags of the content project (e.g., within a specific space or environment). A listing 1100 of the tags is shown. As shown, the tag names 1102 and tag ID's 1104 are listed.

A visibility filter 1106 enables filtering of the tags based on whether they are private or public.

A "Create Tag" option 1108 is provided to enable creation of new tags for the content project.

FIG. 12 illustrates an interface for editing a user role with permissions based on tags, in accordance with implementations of the disclosure.

In the illustrated implementation, an interface for editing the role of "Customer Education" (reference 1200) is shown, as might be viewed by an administrator or other authorized user. In the section 1202, the permissible actions for the role are defined and edited.

In accordance with implementations of the disclosure, permissions can be set for the role based on tags. For example, the permission setting 1204 is configured to allow read access to any entry across all content types that is tagged with the tag "example tag." In a further example, the permission setting 1206 is configured to allow edit access to all fields and tags, of any entry across all content types and all locales that is tagged with the tag "example tag." These permissions are provided by way of example without limitation, and it will be appreciated that other types of permissions can be set based on tags.

With tag-based permissions defined for a given user role, then access privileges to specific content entries or assets in the CMS, for a user assigned that role, can be controlled through simple addition or removal of tags from the content entries or assets.

It will be appreciated that tag-based restrictions can also be used to define the permissible actions for a user role. For example, the user role can be configured so that users having that role are not allowed to access content having a certain tag.

It will be appreciated that implementation of tags in a CMS in accordance with implementations of the disclosure provides many advantages over prior systems. Further, application of tags as a form of content entry metadata provides many advantages over tags as a specific field in a content type. For example, tags implemented as a field value requires tags to be defined as an array of values for a specific field in each content type; whereas tags implemented as metadata enables tags to be defined as a native entity for the entire space and is available for association to all entries/assets of all content types in that space. For tags implemented as a field value, then tagging assets would require assets to be wrapped in a dedicated content type; whereas tags implemented as metadata can be applied directly to an asset. For tags implemented as a field value, then search and filtering is bound to a content type, with no way to search across multiple content types; whereas tags implemented as metadata enables tags to be used to search across content types, and further enables using multiple tags and logical operators to scope the search. For tags implemented as a field value, then modifying tags requires one to update each content type and re-tag all previously tagged entries; whereas tags implemented as metadata enables updating the label without changing the tag ID with one click, so that all tagged content remains intact. For tags implemented as a field value, then controlling tag visibility is problematic as all tags are exposed in the CDA by default; whereas tags implemented as metadata enables tags to be set to be private (only accessible in CMA) or public (CMA+CDA). For tags implemented as a field value, then exporting space content is not benefitted, as the tags cannot be used to filter content to be exported; whereas tags implemented as metadata enables tags to be used to filter what content gets exported from the space.

Traditional content management systems, e.g., like Wordpress™ were designed to store and present content elements like text, images and video on websites. That is, the traditional CMS approach is to manage content in one big bucket, i.e., content, images, HTML, CSS. Unfortunately, this made it impossible to reuse the content because it was commingled with code. As digital platforms have evolved, the need for more flexible solutions emerged. For instance, enterprises are now developing websites, mobile sites, apps, digital displays, conversational interfaces and more. Meanwhile, the traditional CMS organizes content in webpage-oriented frameworks, making it impossible for the same content to adapt to other digital platforms.

In one embodiment, the content management system (CMS) of the described embodiments is a headless CMS. A headless CMS functions as a "content" repository, where the content is separated or decoupled from the presentation layer head. Because of this decoupling, the content is not page-based. As described above, aspects of the headless CMS described herein provide for editors that allow for efficient structuring of content. The structuring of content enables for efficient management of said content and access to said content using specialized application specific interface (API) calls.

In one embodiment, the content infrastructure includes APIs for content management (e.g., content management API), previewing (e.g., content preview API), images (e.g., images API), and display (e.g., content delivery API), to deliver content to any application, platform, form factor, device, IOT, and website.

The content delivery API (CDA) is a read-only API for delivering content from the CMA to apps, websites and other media. In one embodiment, content is delivered as JSON data, and images, videos and other media as files. In one embodiment, the CDA is available via a globally distributed content delivery network. By way of example, the server closest to the user serves all content, both JSON and binary. Serving from the closest server minimizes latency, which especially benefits mobile apps. In one embodiment, content of the CMS is hosted in multiple global data centers, which greatly improves the availability of content. In one configuration, the content management API (CMA) is a read-write API for managing content. Unlike the content delivery API, the content management API requires the user to be authenticated. In some embodiments, the CMA may be used in several use cases, such as automatic imports from WordPress™, Drupal™, and other apps. In other embodiments, the CMA may be integrated with other backend systems, such as an e-commerce shop.

The content preview API is a variant of the CDA for previewing your content before delivering for use by consuming applications (i.e., for display). For example, the content preview API may be used in combination with a "preview" deployment of a website (or a "preview" build of a mobile app) that allows content managers and authors to view their work in-context, as if it were published, using a "preview" access token as though it were delivered by the CDA.

The images API allows for resizing and cropping of images, changing image background colors and/or converting images to different formats. In one embodiment, using the images API for these transformations allows for upload of high-quality assets, delivering exactly what an app needs.

Figure 13:
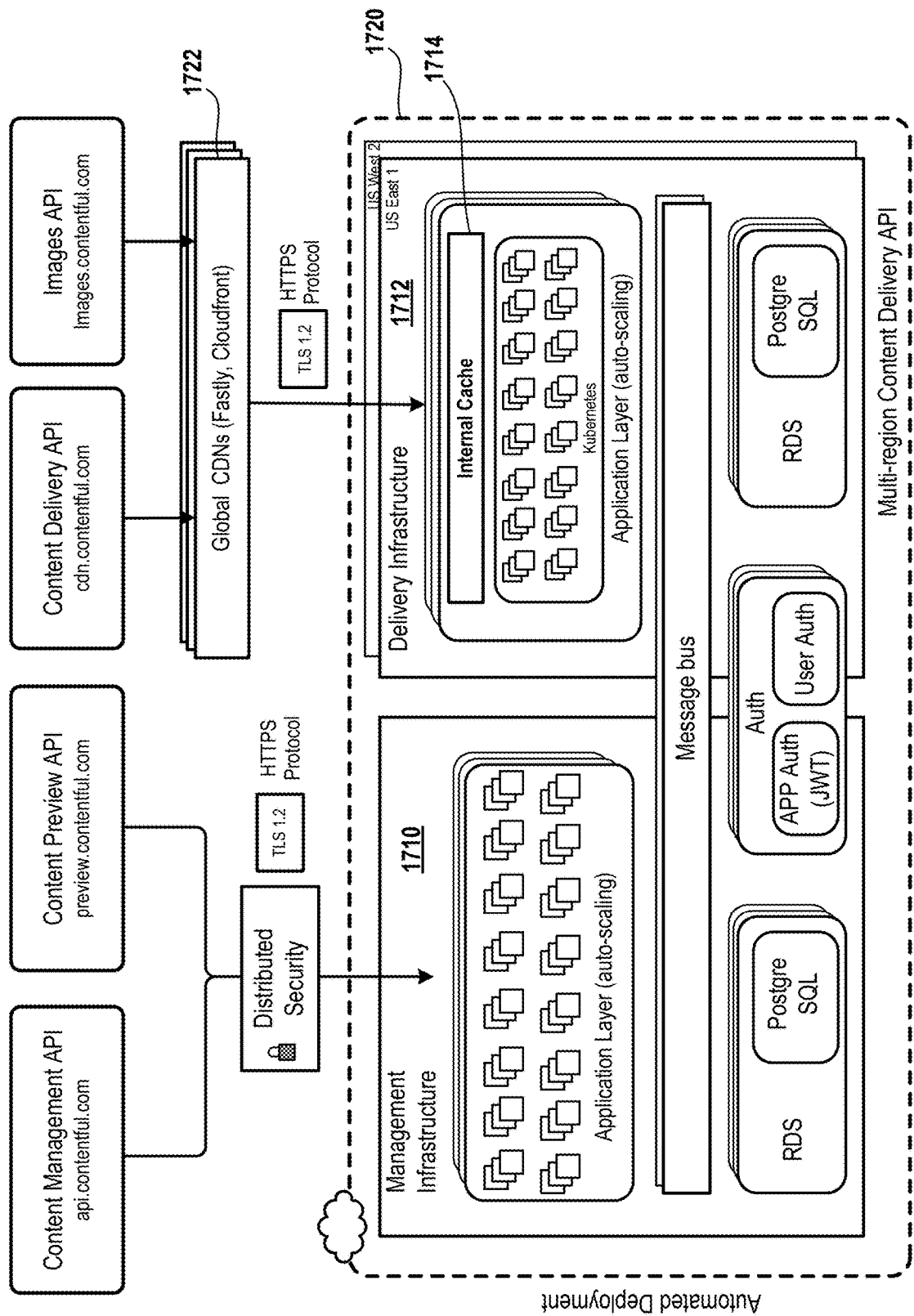
FIG. 13 illustrates an example of how a content management API (CMA) and a content preview API (CPA) can make calls to a content management system (CMS), in accordance with implementations of the disclosure.

FIG. 13 illustrates an example of how the content management API (CMA) and the content preview API (CPA) can make calls to the content management system (CMS) 1720. In one configuration, the CMS 1720 includes compute and storage resources for management of structured content. As described above, a web editor provides for a user interface (UI) that remote client device uses to access the CMS 1720. Based on the type of content creation and/or editing being performed via the UI of the web editor, either the CMA or CPA are used to make API calls to the management 1710 compute and storage resources. The compute and storage resources which run the CMS 1720, in one embodiment, are run in a cloud based environment. The cloud based environment, for example, may be provided by a cloud compute and storage servicing entity, e.g., such as Amazon Web Services (AWS)™, Google™ Cloud, Microsoft™ Azure™, or other serving entity. In some embodiments, these servicing entities are referred to as hosting services, which provide the hardware and internet connectivity to execute applications, processes, and workflows using various types of hardware configurations. In other embodiments, private cloud systems may be run instead of using third party hosting services. In some configurations, the hardware configurations may include virtualized hardware and expandable storage to meet the processing needs of the CMS 1720. Broadly speaking, the CMS 1720 is executed using cloud infrastructure, which includes the use of multiple interconnected data centers throughout the world.

In one configuration, the CMS 1720 also includes a delivery component 1712, which is configured to service processing operations from the content delivery API and the images API. As shown, in one embodiment, the delivery component 1712 is provisioned with internal cache 1714, which is optimized to interface with a global content delivery network (CDN), which in turn handles calls from the content delivery API and the images API. The CDN, in one embodiment, is a widely distributed service that enables rapid and efficient delivery of content to users throughout the world. In one embodiment, the delivery component 1712 is part of the CMS 1720, and is also executed on compute and storage of a cloud infrastructure. In one embodiment, structured content is prepared and/or edited using the management component 1710, before it is published for external consumption. By separating structured content in the cloud infrastructure, it is possible to prevent non-ready content to be accessed and delivered using the CDA.

Agents accessing the CMS 1720, including organizations, individual users, as well as APPs, are authenticated by an authentication and authorization system. In some implementations, user authentication uses MySQL. In some implementations, APP authentication uses JSON Web Tokens.

It should be apparent that the present embodiments may be practiced without some or all of these specific details. Modification to the modules, code and communication interfaces are also possible, so long as the defined functionality for the content management system (CMS) or modules of the CMS is maintained. In other instances, well-known process operations have not been described in detail in order not to unnecessarily obscure the present embodiments. In some implementations, any of the above-described systems of the present disclosure, in part or in whole, can constitute means for performing or implementing any of the embodiments of the present disclosure. In some embodiments, the means for language, e.g., for configuring or exposing is embodied in tangible media, wherein the tangible media is configured to store executable program code segments to enable the use of the means. In some embodiments, the means for language can be understood to be related actual code segments that can work either as stand alone code when executed or in communication or in conjunction with code executed by or for functionality of the CMS.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

The foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A process for rendering a user interface for a content management system (CMS) that enables storage and retrieval of structured content, comprising:
   providing, over a network, the user interface for rendering through a browser of a client device;
   wherein the user interface is configured to enable configuring a content project, said content project including a content model, the content model defining a plurality of content types for the content project;
   wherein a plurality of content entries are defined according to the content types, wherein each content entry is structured in accordance with a given content type from which the content entry is defined, so that multiple content entries are defined from a given content type;
   wherein the user interface is configured to enable at least one tag to be set in association with any of the plurality of content entries, the tag having a visibility setting that controls whether the tag itself is enabled to be used in queries received through a content delivery Application Programming Interface (CDA) of the CMS, the tag having the visibility setting set to a public setting that enables the tag to be used in said queries; and wherein the CMS exposes the CDA configured to enable, responsive to a single Application Programming Interface (API) call to the CDA that references the tag, retrieval of the content entries across the plurality of content types that have the tag set in association therewith.

2. The process for rendering a user interface of claim 1, wherein the plurality of content types includes a first content type and a second content type, and wherein the plurality of content entries includes a first plurality of content entries defined from the first content type and a second plurality of content entries defined from the second content type;

wherein the single API call enables the retrieval of a first subset of the first plurality of content entries and a second subset of the second plurality of content entries that have the tag set in association therewith.

3. The process for rendering a user interface of claim 1, wherein each content type defines a configuration of fields for each content entry defined from the content type, the fields being user-customizable for a given content entry.

4. The process for rendering a user interface of claim 3, wherein the content type does not define whether the at least one tag is set in association with a content entry defined from the content type.

5. The process for rendering a user interface of claim 3, wherein the at least one tag being set in association with a content entry does not affect the fields of the content entry.

6. The process for rendering a user interface of claim 1, wherein the at least one tag being set in association with a content entry assigns the at least one tag to the content entry as metadata.

7. The process for rendering a user interface of claim 1, wherein the single API call identifies the content project.

8. The process for rendering a user interface of claim 1, wherein the single API call enables retrieval of content entries of different content types that have the tag set in association therewith.

9. The process for rendering a user interface of claim 1, further comprising:

means for configuring one or more user roles for access to the content project, wherein the access to the content project is controlled by a permission set based on the at least one tag.

10. The process for rendering a user interface of claim 9, wherein the permission is configured to enable access to content entries of the content project having the tag associated therewith.

11. The process for rendering a user interface of claim 10, wherein the permission is configured to prevent access to content entries of the content project not having the tag associated therewith.

12. The process for rendering a user interface of claim 10, wherein setting the tag in association with a given content entry enables access to the given content entry by a user role for which the permission is set.

13. The process for rendering a user interface of claim 10, wherein the permission is configured to define a type of access to content entries of the content project having the tag associated therewith.

14. The process for rendering a user interface of claim 13, the type of access includes one or more of read access and edit access.

15. The process for rendering a user interface of claim 1, wherein the content project is defined by a content space having a plurality of environments, each environment defining a version of the content project.

16. The process for rendering a user interface of claim 15, wherein the at least one tag is defined for the content space, such that the at least one tag is usable across the plurality of environments of the content space.

17. The process for rendering a user interface of claim 1, wherein the tag is accessible through a content management API (CMA) of the CMS.

18. The process for rendering a user interface of claim 17, further comprising:

processing a second tag set in association with at least one of the plurality of content entries, wherein the second tag is accessible through the CMA, and wherein the second tag has a visibility setting set to a private setting that does not enable to second tag to be used in queries received through the CDA.

19. A process for rendering a user interface for a content management system (CMS) that enables storage and retrieval of structured content, comprising:

providing, over a network, the user interface for rendering through a browser of a client device;

wherein the user interface is configured to enable configuring a content project, said content project including a content model, the content model defining a plurality of content types for the content project;

wherein a plurality of content entries are defined according to the content types, wherein each content entry is structured in accordance with a given content type from which the content entry is defined, so that multiple content entries are defined from a given content type;

wherein the user interface is configured to enable at least one tag to be set in association with any of the plurality of content entries, the tag being accessible through a content management Application Programming Interface (CMA) of the CMS, the tag further having a visibility setting that controls whether the tag itself is enabled to be used in queries received through a content delivery Application Programming Interface (CDA) of the CMS, the tag having the visibility setting set to a private setting that does not enable the tag to be used in said queries; and wherein the CMS exposes the CMA configured to enable, responsive to a single Application Programming Interface (API) call to the CMA that references the tag, retrieval of the content entries across the plurality of content types that have the tag set in association therewith.

\* \* \* \* \*